J. V. COSTELLO.
CHAIN.
APPLICATION FILED APR. 15, 1908.

904,846.

Patented Nov. 24, 1908.

Witnesses
John F. Cavanagh
E. D. Ogden

Inventor
John V. Costello
By Howard E. Barlow
Atty.

UNITED STATES PATENT OFFICE.

JOHN V. COSTELLO, OF CRANSTON, RHODE ISLAND.

CHAIN.

No. 904,846.   Specification of Letters Patent.   Patented Nov. 24, 1908.

Application filed April 15, 1908. Serial No. 427,199.

*To all whom it may concern:*

Be it known that I, JOHN V. COSTELLO, a citizen of the United States, residing at Cranston, in the county of Providence and State of Rhode Island, have invented certain new and useful Improvements in Chains, of which the following is a specification, reference being had therein to the accompanying drawing.
This invention relates to an improvement in the construction of chain, and has for its object to provide a chain to be used more particularly for ornamental purposes, such as for bracelets, belts, collars, fobs, and the like, for personal wear.

This chain is formed of suitable wire, each link being made with two loops or eyes, one at either end thereof, and having the members at its center portion twisted together. The chain is formed by connecting together these double ended links, each link being connected at both ends to the next adjacent link.

Figure 1:
Figure 2:
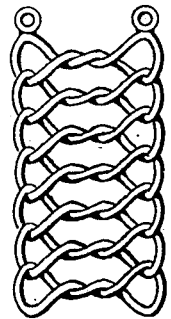
Figure 3:
Figure 4:
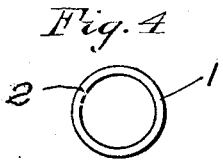
Figure 5:
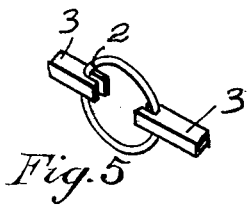
Figure 6:
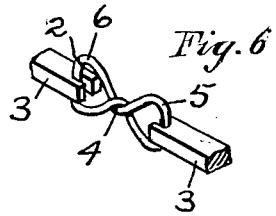
Figure 7:
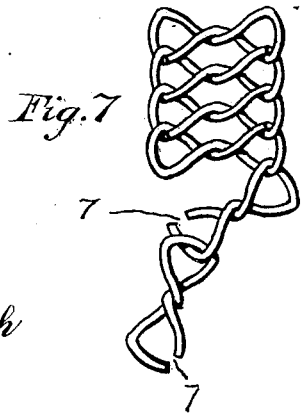

An essential feature of my improved chain is that the eyes at both ends of the link are obliged to be twisted or curbed so that when the links engage each other the chain will lie flat and prevent the same from knotting or kinking while being manipulated.
With these and other objects in view, the invention consists of certain novel features of construction, as will be more fully described and particularly pointed out in the appended claims.
In the accompanying drawings: Figure 1—is a view of one form of my improved chain showing the links with a single twist at their center portion. Fig. 2—shows another form of my chain illustrating the links as having a double twist at their center portion. Fig. 3—is an edge view of the chain showing the ends of the links as being curbed. Fig. 4—shows a link as being first formed into a ring or circle with its ends connected together. Fig. 5—is a perspective view showing the tools in position to twist the ring and form the link. Fig. 6—shows the link twisted at its center portion and forming a loop at each end. Fig. 7—illustrates the manner of assembling the links.

The links of this chain are formed of any suitable wire and the same may be made automatically by a machine, if desired, but the links are preferably formed by hand and then subsequently assembled.

One practical way of constructing the links is to first form a ring 1, see Fig. 4, and solder or otherwise secure its ends together as at 2. The securing of these ends together is for the purpose of facilitating the twisting the middle portion of the ring. After the ring is thus made two pairs of pliers, or other suitable bending tools, as represented at 3—3 in Fig. 5, are applied to each side of the ring, said ring being gripped on one side just below the soldered portion 2. The tools are then rotated in opposite directions and the twist set into the middle portion 4 and separate eyes 5 and 6 are formed at either end.

The design of the chain may be varied by forming any number of twists in the center portion of the links.

An essential feature of this construction is that after the link is twisted, forming the eye on either end, each eye is then twisted again or curbed, as illustrated in Fig. 3, which twist or curbing is necessary in order to have the same act properly and look well after the links are connected together. In order to assemble the links after having been thus formed it is only necessary to sever or separate the wire at 2 in one of the loops where the ends were originally joined. The open end of each link being placed first on one side and then on the other of each alternate link whereby said open end may be hooked into the closed eye of the adjacent link, thus the chain may be quickly and easily assembled by separating the wire at but one place in only one eye of each link. After the links are joined together these ends may be soldered or otherwise secured together making the chain complete. This chain is of practical construction, is novel and ornamental in appearance and by its use such articles as bracelets, watch-chains, fobs, belts, collars and the like, may be made most attractive in appearance. By the curbing of the links the chain will lie flat and will not kink or knot.

Having thus described my invention, what I claim as new and desire to secure by Letters Patent, is:

1. A chain constructed of a plurality of links, each made of a single continuous piece of wire having its ends joined, the same being formed with a loop at each end and twisted at its middle portion between said loops, each link being connected at both ends to each adjacent link.

2. A chain constructed of a plurality of links, each link being formed with a loop at each end and twisted at its middle portion, each of said loops being curbed, and said links being connected at both ends to each adjacent link.

3. A chain constructed of a plurality of links, the same being formed with a loop at each end and twisted at its middle portion between said loops, each link being made of a single piece of wire whose ends are joined together, the joint being formed in one of the eyes, said links being connected at both ends to each adjacent link.

In testimony whereof I affix my signature in presence of two witnesses.

JOHN V. COSTELLO.

Witnesses:
 HOWARD E. BARLOW,
 E. I. OGDEN.